(12) United States Patent
Junnarkar et al.

(10) Patent No.: US 9,231,995 B2
(45) Date of Patent: Jan. 5, 2016

(54) SYSTEM AND METHOD FOR PROVIDING ASYNCHRONY IN WEB SERVICES

(71) Applicant: ORACLE INTERNATIONAL CORPORATION, Redwood Shores, CA (US)

(72) Inventors: Nilesh Junnarkar, Palo Alto, CA (US); Manoj Kumar, Alameda, CA (US); Uday Joshi, San Ramon, CA (US); Olga Peschansky, Castro Valley, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 483 days.

(21) Appl. No.: 13/631,693

(22) Filed: Sep. 28, 2012

(65) Prior Publication Data

US 2013/0086154 A1    Apr. 4, 2013

Related U.S. Application Data

(60) Provisional application No. 61/541,909, filed on Sep. 30, 2011.

(51) Int. Cl.
*G06F 15/16* (2006.01)
*H04L 29/08* (2006.01)
*G06F 9/54* (2006.01)

(52) U.S. Cl.
CPC ............... *H04L 67/02* (2013.01); *G06F 9/547* (2013.01); *H04L 67/26* (2013.01); *G06F 2209/548* (2013.01)

(58) Field of Classification Search
USPC .......................................... 709/203, 219, 223
See application file for complete search history.

(56) References Cited

U.S. PATENT DOCUMENTS

| | | | |
|---|---|---|---|
| 2005/0234928 A1* | 10/2005 | Shkvarchuk et al. | 707/100 |
| 2006/0095576 A1* | 5/2006 | Perry et al. | 709/227 |
| 2007/0088790 A1* | 4/2007 | Shenfield et al. | 709/223 |
| 2007/0162560 A1* | 7/2007 | Jin | 709/217 |
| 2008/0082965 A1* | 4/2008 | Atkin et al. | 717/118 |
| 2012/0102109 A1* | 4/2012 | Eberhard | 709/204 |

OTHER PUBLICATIONS

Wikipedia, the free encyclopedia, In memory data grid, http://en.wikipedia.org/wiki/In_memory_data_grid, 2 pages, Sep. 28, 2012.

* cited by examiner

*Primary Examiner* — Philip B Tran
(74) *Attorney, Agent, or Firm* — Tucker Ellis LLP

(57) ABSTRACT

A system and method for providing asynchrony in web services, such as Java-based web services, including in some instances use of a distributed in-memory data grid. Embodiments of the system allow a client application or client to make requests upon a server application or service. A queuing feature, such as one or more Java Message Service (JMS) queues, can be used to store incoming requests at the server side, to support asynchronous behavior. In accordance with an embodiment, instead of or in addition to JMS, the system can use a distributed in-memory data grid, such as Oracle Coherence, to provide queuing functionality.

18 Claims, 6 Drawing Sheets

SYSTEM AND METHOD FOR PROVIDING ASYNCHRONY IN WEB SERVICES

CLAIM OF PRIORITY

This application claims the benefit of priority to U.S. Provisional Patent Application titled "SYSTEM AND METHOD FOR PROVIDING ASYNCHRONICITY IN WEB SERVICES"; Application No. 61/541,909; filed Sep. 30, 2011; which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the present invention are generally related to web services, and are particularly related to a system and method for providing asynchrony in web services, including in some instances use of a distributed in-memory data grid.

BACKGROUND

Generally, a web service is a software application or component that supports machine-to-machine service-based interaction over a network, such as the Internet or another form of network. Typically, each web service provided by a system includes an interface that is described in a Web Services Description Language (WSDL). Other systems, e.g., clients, can interact with the web service by sending requests to the interface, typically in the form of Simple Object Access Protocol (SOAP) messages formatted in Extensible Markup Language (XML) format, and conveyed to the web service using Hypertext Transfer Protocol (HTTP).

Some programming language API specifications, such as the Java API for XML Web Services specification (JAX-WS, which is provided as part of the Java EE platform), support the development and deployment of asynchronous web service clients and endpoints. However, JAX-WS and its associated reference implementation primarily address asynchronous threading at the client. Techniques for supporting server-based asynchronous processing of web service requests are also of interest. These are generally the types of environment that embodiments of the invention are intended to be used with.

SUMMARY

Disclosed herein is a system and method for providing asynchrony in web services, such as Java-based web services, including in some instances use of a distributed in-memory data grid. Embodiments of the system allow a client application or client to make requests upon a server application or service. A queuing feature, such as one or more Java Message Service (JMS) queues, can be used to store incoming requests at the server side, to support asynchronous behavior. In accordance with an embodiment, instead of or in addition to JMS, the system can use a distributed in-memory data grid, such as Oracle Coherence, to provide queuing functionality.

DETAILED DESCRIPTION

Figure 1:
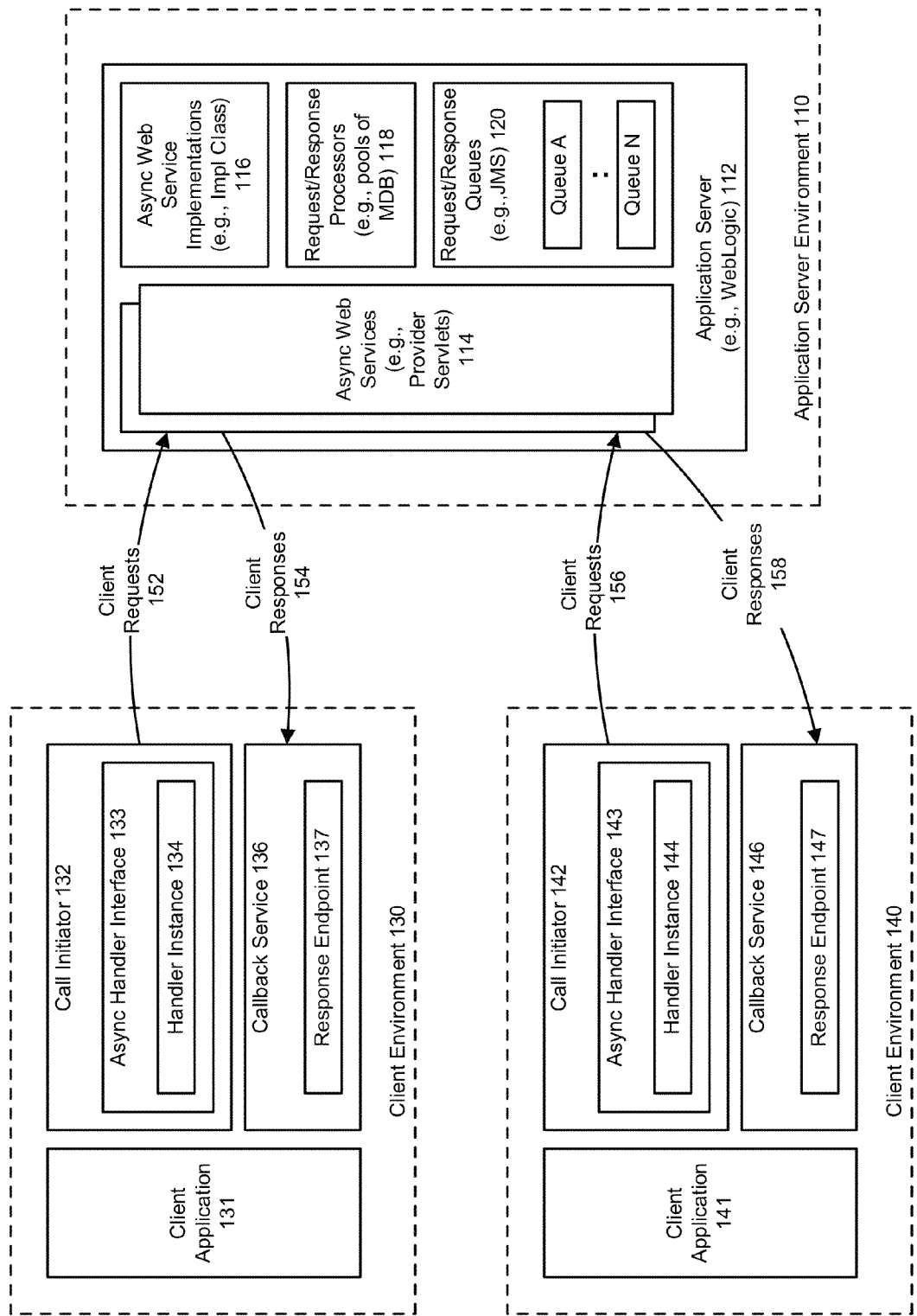
FIG. 1 illustrates a system for providing asynchrony in web services, in accordance with an embodiment.

As described previously, a web service generally is a software application or component that supports machine-to-machine service-based interaction over a network, such as the Internet or another form of network. A typical web service includes an interface described in WSDL which enables other systems to interact with the web service by sending requests in the form of SOAP messages formatted in XML and conveyed using HTTP.

In accordance with an embodiment, disclosed herein is a system and method for providing asynchrony in web services, such as Java-based web services. Embodiments of the system allow a client application or client to make requests upon a server application or service. Rather than requiring the client to wait until the service is ready to fulfill the request, a queuing feature, such as one or more JMS queues, can be used to store incoming requests at the server side, to support asynchronous behavior.

In accordance with an embodiment, instead of or in addition to JMS, the system can use a distributed in-memory data grid or data grid, such as Oracle Coherence, to provide a more lightweight environment and improve performance, particularly in a clustered WebLogic or other highly performant environment.

Web service asynchrony can generally refer to different means of supporting asynchronous web service behavior, for example:

Transport-layer Asynchrony: rather than receiving responses on a HTTP back-channel as part of a single HTTP interaction, a client can publish a web service endpoint that will receive response messages as an independent inbound request;

Buffering: request and response messages can be stored in queues prior to processing/delivery, which allows for better absorption of temporary load spikes, and better quality-of-service;

Separation of Request and Response Processing: some use cases require separation between request processing and response generation, e.g., a web service request may be used by an application to trigger processing at an external system, the application will later receive notification that the external processing has finished and send the web service response; and Asynchronous Clients: some specifications such as JAX-WS define an API for asynchronous clients that supports thread-level asynchrony, i.e., the initiating client thread is not blocked while waiting for the response message.

In accordance with an embodiment, a server-side asynchronous programming model for web services is described herein, which can be used with systems and web services developed in accordance with the JAX-WS specification and other advanced use cases.

As described previously, buffering can be used to queue web service request and response messages, prior to their processing/delivery, which allows for better absorption of load spikes, and better quality-of-service.

In accordance with an embodiment, buffering can be accomplished using message processors (e.g., a Message Driven Bean (MDB)). A large number of processor instances may increase resource requirements such as the required number of threads, database connections, or memory, particularly if there are many asynchronous web services running on a server. In accordance with an embodiment, several web services can share a common message processor pool (e.g., a pool of MDBs). Since very fast asynchronous operations may be hindered by very slow ones sharing the same pool, the system can support the use of more than one named pools, to help prevent such operations from affecting one other.

FIG. 1 illustrates a system for providing asynchrony in web services, in accordance with an embodiment. As shown in FIG. 1, in accordance with an embodiment, an application server environment 110 includes an application server, e.g., a WebLogic server 112. The application server can include one or more asynchronous web services (Async applications), e.g., provider servlets 114, which can be accessed by other systems. In accordance with an embodiment, each web service is implemented by a web service implementation, e.g., an Impl class 116. In accordance with an embodiment, the application server also includes one or more request/response processors, e.g., pools of MDBs 118, and a plurality of request/response queues, e.g., JMS queues 120.

As further shown in FIG. 1, in accordance with an embodiment, the system is configured to process requests from one or more other systems, for example a plurality of client environments 130, 140. Each client environment can include a client application or client 131, 141, a call initiator 132, 142, together with an asynchronous handler interface 133, 143 for handling request instances 134, 144, and a callback service 136, 146 that allows the client to indicate a response endpoint 137, 147 at which it will receive responses from the web services.

During operation, the clients can provide client requests 152, 156 to the web services, and receive appropriate client responses 154, 158. In accordance with an embodiment, a typical asynchronous web service flow using JMS queues and MDB processors is as follows:

1. Before the web service (Async application) is run, JMS queues are created, including a queue for requests and another for responses.
2. An Async endpoint is deployed as a provider servlet. The endpoint can receive an incoming request message from a client, and put it into a JMS queue for asynchronous requests. Requests from all deployed endpoints from all applications can go into the same JMS queue. A second JMS queue holds responses to be sent to the callback endpoint, the address of which is provided in the original request.
3. Each endpoint in an Async application deploys two MDBs, one of which will be driven by the request JMS queue, and the other by the response JMS queue.
4. After the message is added to the request JMS queue, the thread that received the request sends an acknowledgement on the back-channel to the client (e.g., HTTP 202) and is finished processing.
5. The request-processing MDBs listen to the request queue for messages that match their endpoint. At some point, JMS will de-queue a request message for that MDB. The MDB then runs a common RequestProcessor code which has been instantiated for the given endpoint, and invokes any business method associated therewith, which runs on the thread of the MDB. When the processing is finished the MDB is returned to the pool and resumes listening for messages.
6. At certain checkpoints in the flow, the RequestProcessor also puts status messages into the JMS queue. This prevents repeated calls to a business method which is declared non-idempotent. Upon completion, the response MDB removes (consumes) all status messages related to the request.
7. When a business method returns a response, the RequestProcessor deposits the response into another JMS queue for Async responses. This ends processing in the request MDB.
8. The response MDBs listen to the response JMS queue. When the response is de-queued by an MDB, it runs a ResponseProcessor code which has been instantiated for the given endpoint, which in turn sends the response to the callback supplied by the client in the original request.
9. If it is necessary to return a SOAP fault as a response, it is returned as a regular response with a named fault type; the callback endpoint can unwrap the fault and send a regular SOAP fault back to the client.

Figure 2:
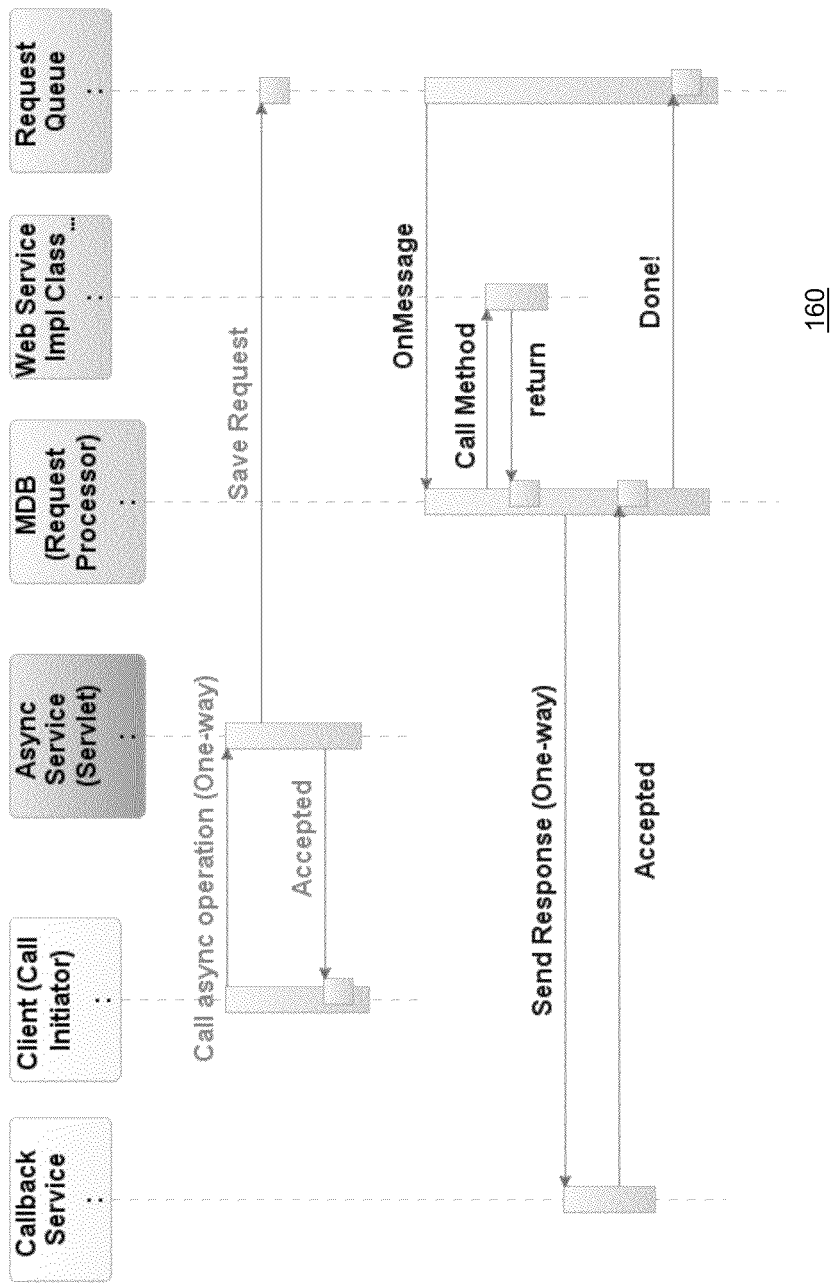
FIG. 2 illustrates the use of the system to perform asynchronous request processing, in accordance with an embodiment.

FIG. 2 illustrates the use of the system to perform asynchronous request processing, in accordance with an embodiment. Generally, services can be configured to either utilize only a request message queue, or utilize both request and response message queues. FIG. 2 illustrates the message flow 160 when only a request message queue is configured, including wherein the request message is saved to the request queue and the HTTP interaction is completed by returning a status. Separately, a request processor dequeues request messages, invokes the web service, and delivers response messages to the client-provided endpoint.

As with all asynchronous, distributed systems, the interactions and timing windows can be difficult to orchestrate, so clients must be aware that it is technically possible to receive the inbound response message before the initiating thread processes the status.

Figure 3:
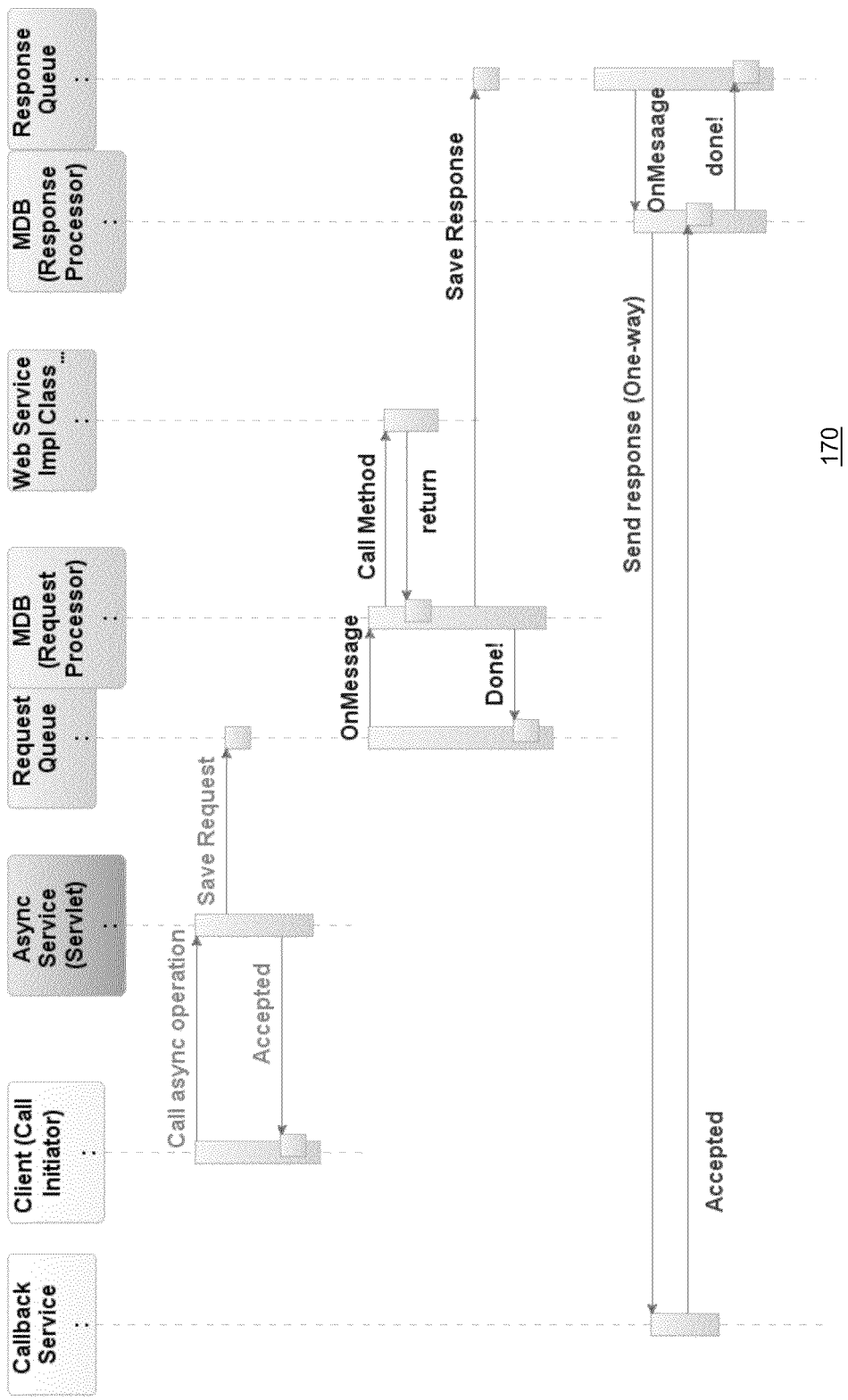
FIG. 3 further illustrates the use of the system to perform asynchronous request processing, in accordance with an embodiment.

FIG. 3 further illustrates the use of the system to perform asynchronous request processing, in accordance with an embodiment. FIG. 3 illustrates the message flow 170 when both request and response queues are utilized. In this flow, the processing of the request message is identical, but the execution of the web service method results in the response message being saved to the response queue rather than delivering it to the client. Finally, a response processor delivers the response message to the client-provided endpoint.

The previously-described embodiments illustrate a server-side asynchronous programming model for web services using a combination of JMS queues and MDB processors. In accordance with an embodiment, instead of or in addition to JMS, the system can use a distributed in-memory data grid, such as Oracle Coherence.

Figure 4:
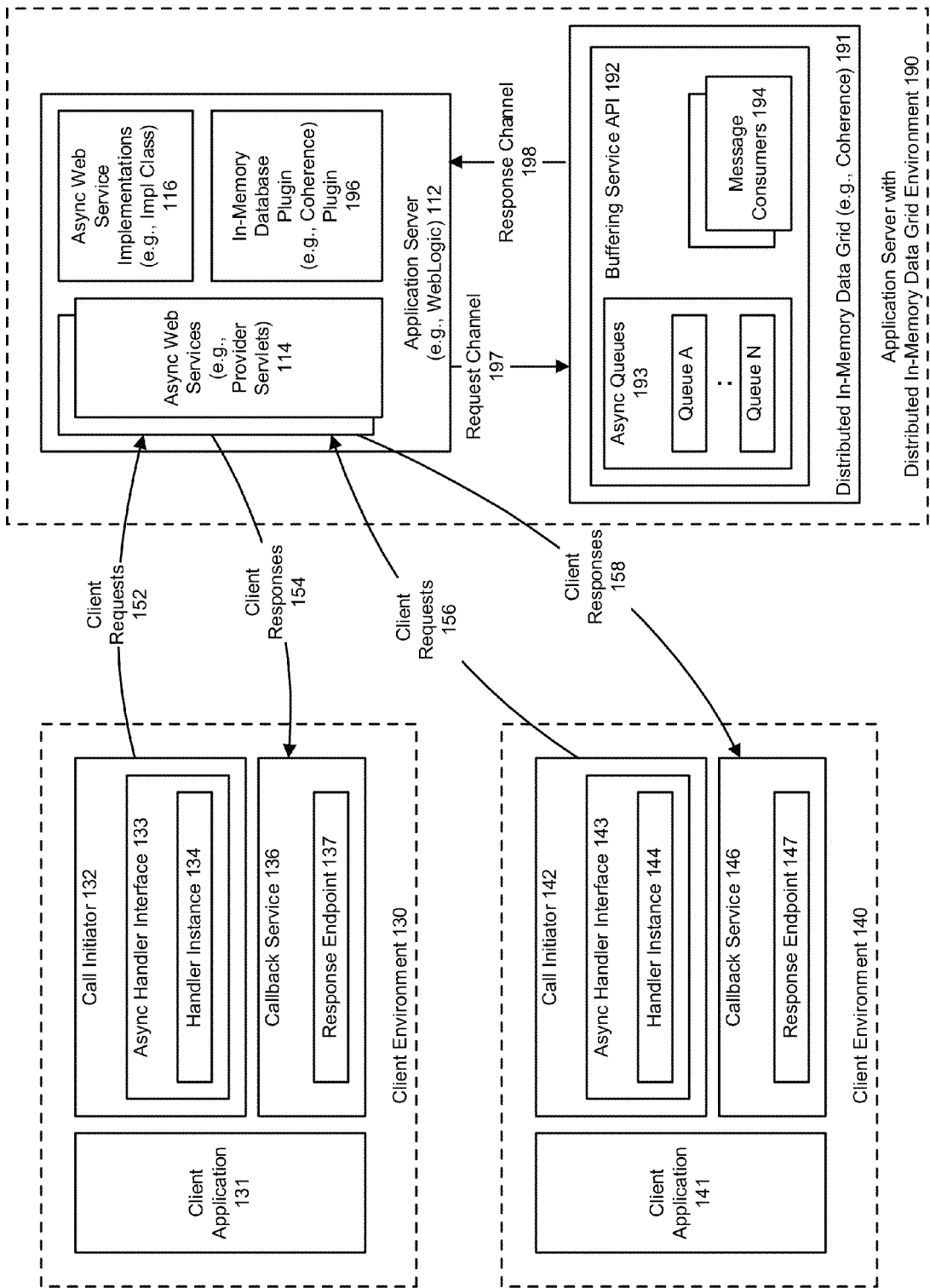
FIG. 4 illustrates a system for providing asynchrony in web services, including the use of a distributed in-memory data grid, in accordance with an embodiment.

FIG. 4 illustrates a system for providing asynchrony in web services, including the use of a distributed in-memory data grid, in accordance with an embodiment. As shown in FIG. 4, the system is similarly configured to process requests from one or more other systems, for example a plurality of client environments, wherein each client environment can include a client application or client, a call initiator, and a callback service that allows the client to indicate a response endpoint at which it will receive responses.

In accordance with an embodiment, the system 190 can use a distributed in-memory data grid 191, such as Oracle Coherence, wherein the distributed in-memory data grid can include a buffering service and API 192, which provides access to a plurality of asynchronous queues 193, and one or more message consumers 194. The application server can include a distributed in-memory data grid plugin 196, which enables the application server to access request channels 197 and response channels 198 provided by the distributed in-memory data grid.

In accordance with an embodiment, the distributed in-memory data grid server-side asynchronous programming model provides a similar overall flow as that described previously, but replaces JMS queues with queues provided by the buffering service API, and replaces MDBs with message consumers, also provided by the buffering service API, and differs from the JMS-based flow as follows:

1. At application startup time, each endpoint initialization code creates one or more request and response buffering service queues. The queues are specific to each endpoint and divided into request-holding and response-holding queues. Status messages are not placed in a queue; the endpoint init code creates a distributed cache specifically for status messages.
2. The endpoint receives an incoming request and puts it into a queue for async requests, which is implemented as a buffering service queue, rather than JMS queue.
3. The role of MDBs is assumed by message consumers, which wrap the RequestProcessor or ResponseProcessor codes depending on the queue they are associated with, but they are instantiated internally by the Async application code and are not included into the application itself. Message consumers for each endpoint are registered with the buffering service at the application startup time.
4. This step is similar, inasmuch as, after the message is added to the request queue, the thread that received the request sends acknowledgement to the client and is finished processing.
5. When the time comes to de-queue a particular endpoint request from the buffering service queue, the buffering service schedules to run a handle( )method of the request message consumer registered with the endpoint. In contrast to MDBs, in which one or more MDB threads are always present, idle and polling or busy running the business method, the message consumer is scheduled on a new thread only when there is a pending request to process. The thread is freed and may go back to a pool when processing is finished. The task of polling the queue is left to the buffering service. Message consumer instances are dynamically created to process a specific message, after which they can be garbage collected.
6. Status messages (e.g., Coherence-based status messages) are placed and removed from a separate distributed cache, rather than the request queue.
7. When a business method returns a response, the response is deposited into the buffering service queue for responses and the message consumer exits, the reference to its instance is no longer live, and the thread that was running it is free.
8. The response queue is implemented by the buffering service rather than JMS, and, instead of an MDB a response message consumer is scheduled to run, which sends the response to the callback endpoint.
9. The buffering service API allows the message consumer to distinguish between a fatal and non-fatal error from the business method; for example, an authentication error is fatal, and retries can be skipped, even if they are configured; a timeout is a non-fatal error, so the call may be retried later.

Figure 5:
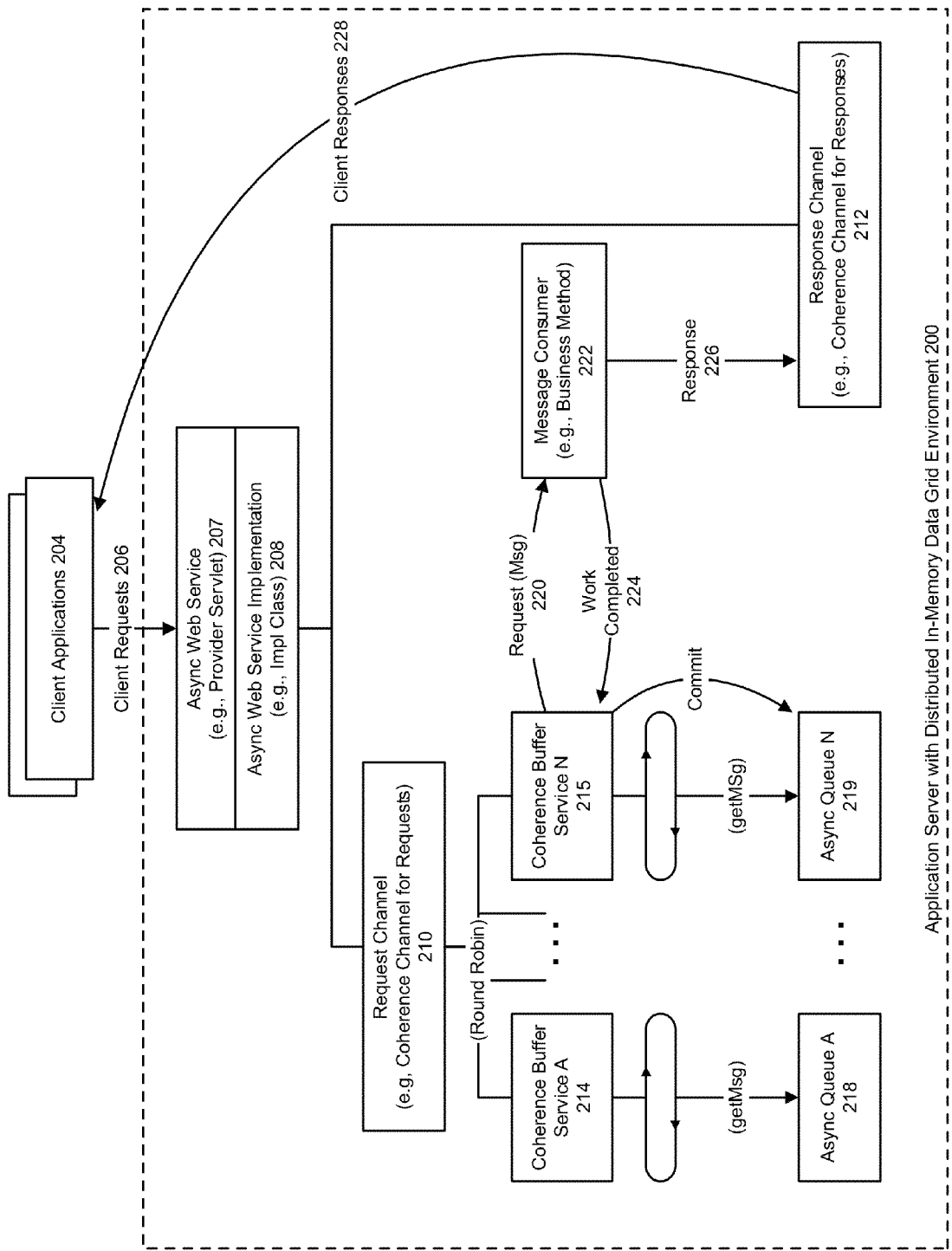
FIG. 5 further illustrates a system for providing asynchrony in web services, including the use of a distributed in-memory data grid, in accordance with an embodiment.

FIG. 5 further illustrates a system for providing asynchrony in web services, including the use of a distributed in-memory data grid, in accordance with an embodiment. As shown in FIG. 5, the system 200 includes one or more web services (Async applications), which are provided as provider servlets 207 implemented by a web service implementation, e.g., an ImpI class 208, and which can receive requests 206 from clients 204.

As further shown in FIG. 5, in accordance with an embodiment, a request channel 210 (e.g., a Coherence channel for requests) allocates requests, using a round-robin method or other method, to one of several buffer services 214, 215, which queue the messages on one of several Async queues 218, 219. The messages can be provided 220 to one or more message consumers (business methods) 222, for processing 224, at which point a response 226 is placed on a response channel 212 (e.g., a Coherence channel for responses), where it can then be provided as a response to the client 228.

In accordance with an embodiment, when using a product such as Coherence, the buffering service queue behaves similar to a JMS queue. For example, the Coherence queue guarantees single delivery and delivery order. Similarly, like JMS, the Coherence queue can be made globally available within a cluster.

In accordance with an embodiment, the queue exposes a poll interface, the getMessage( ) API. In the case of Coherence, if the queue is empty a getMessage( ) call will block until there is a message to deliver. Unlike JMS, there are no selectors, i.e., a message can be delivered to any subscriber to a given queue. Unlike JMS which internally performs periodic polling, in the case of Coherence, the polling is part of the buffering service, which also converts the polling paradigm into the notification paradigm, such that one can register a message consumer that the buffering service will invoke with a message from the Coherence queue.

In accordance with an embodiment, when a message is buffered to the buffering service, it is published or associated with a specific ID (e.g., an entrypoint name). Thus, the buffering service can add JMS-like selectivity to the Coherence queue. A message consumer can also register for a specific ID, so that it gets invoked only with the messages that were buffered with that same ID.

In accordance with an embodiment, the buffering service can support multiple named queues, by keeping a static map of references to existing queues. When a queue is created in a specific VM, the code looks up a named Coherence queue on the cluster. A Coherence queue with that name will be created if it does not already exist. Each named buffering service queue can be associated with one named distributed Coherence queue.

In accordance with an embodiment, to schedule message consumers, the buffering service can use a work manager (a higher-level abstraction to work with thread pools) provided by the application server, which in turn provides a listener feature that is invoked upon certain lifecycle events, such as "WorkCompleted", so that when the consumer's handle( ) event completes, the listener is called.

Figure 6:
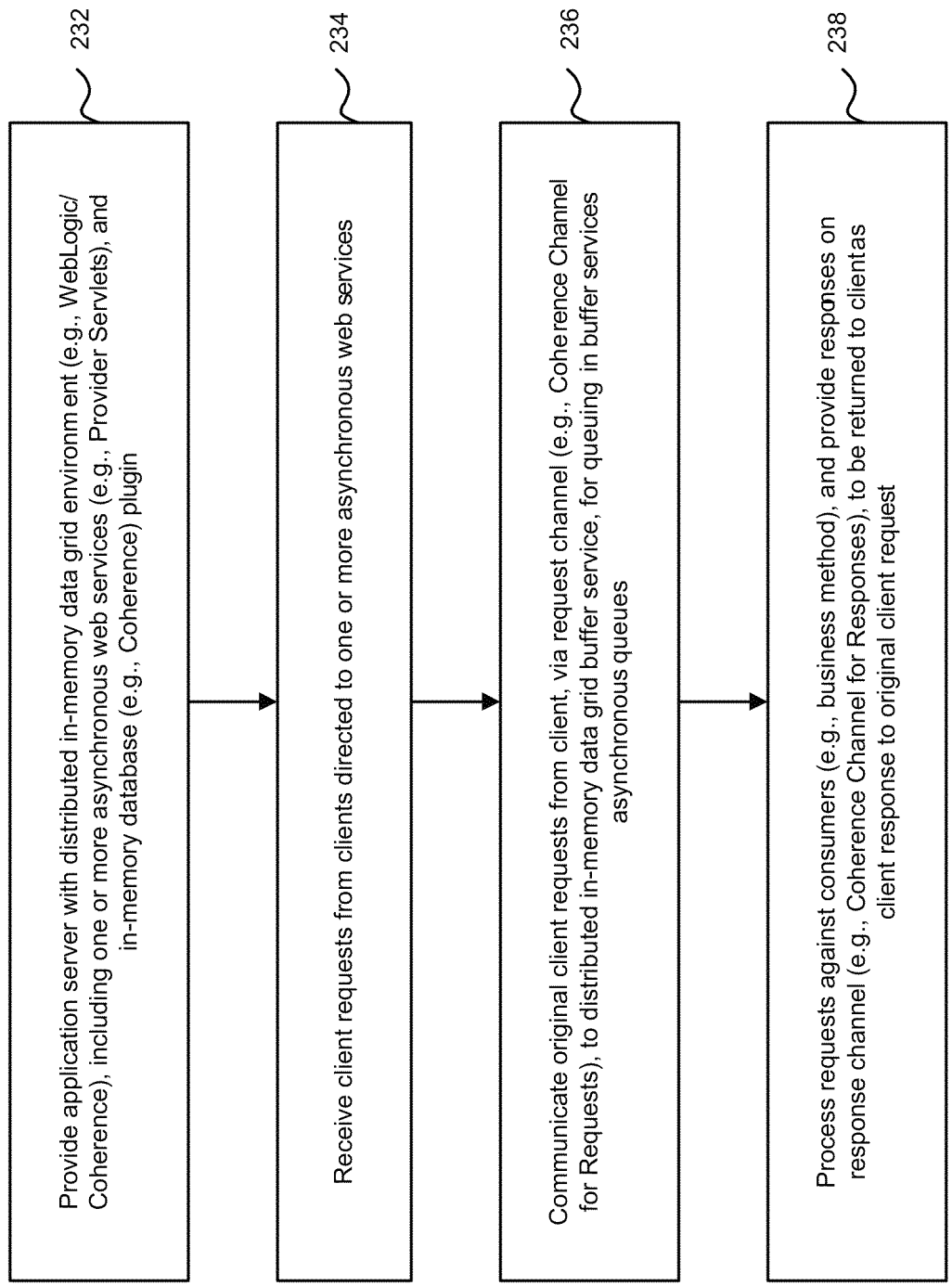
FIG. 6 shows a flowchart of a method for providing asynchrony in web services, including the use of a distributed in-memory data grid, in accordance with an embodiment.

FIG. 6 shows a flowchart of a method for providing asynchrony in web services, including the use of a distributed in-memory data grid, in accordance with an embodiment. As shown in FIG. 6, at step 232, an application server with distributed in-memory data grid environment (e.g., WebLogic/Coherence), is provided, including one or more asynchronous web services (e.g., provider servlets), and a distributed in-memory data grid (e.g., Coherence) plugin.

At step 234, the system receives requests from clients directed to one or more asynchronous web services.

At step 236, the original requests received from the client are communicated, via a request channel (e.g., a Coherence channel for requests), to a distributed in-memory data grid buffer service, for queuing in buffer services asynchronous queues.

At step 238, the system processes requests against consumers (e.g., business method), and provide responses on response channel (e.g., a Coherence channel for responses), to be returned to client as a response to its original request.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for providing asynchrony in web services, the system comprising:
an application server comprising one or more asynchronous web services which can be accessed by clients using one or more requests as messages received by the application server from the clients, wherein each client indicates a response endpoint at which that client is configured to receive responses to requests made by that client to the asynchronous web services;
one or more request/response queues for queuing the requests and the responses;
one or more asynchronous endpoints associated with the asynchronous web services, each of which asynchronous endpoint being configured to receive a request from a client, add the request to the request/response queue, and send an acknowledgement to a requesting client; and
one or more request/response processors associated with the one or more asynchronous endpoints and being configured to process the one or more requests directed to the one or more asynchronous web services, and provide appropriate responses using the one or more request/response queues, each of which is configured to receive a request from a request/response queue directed to that request/response processor, and process the request by a processing associated with that request/response processor.

2. The system of claim 1, wherein:
the one or more request/response processors comprise a plurality of Message Driven Beans (MDB); and
the plurality of request/response queues comprise a plurality of Java Message Service (JMS) queues.

3. The system of claim 1, further comprising:
a plurality of named message processor pools; and
a plurality of web services, wherein a selection of the web services share a common message processor pool.

4. The system of claim 1, further comprising:
a distributed in-memory data grid for use in processing the requests, wherein the distributed in-memory data grid comprises a buffering service which provides access to a plurality of asynchronous queues for queuing the requests, and one or more message consumers for processing the requests.

5. The system of claim 4, wherein the application server selectively accesses the buffering service using request channels and response channels provided by the distributed in-memory data grid.

6. The system of claim 1, wherein:
the one or more request/response processors comprise one or more message consumers dynamically instantiated at the application server, each of the one or more message consumers being configured to process a specific request of the one or more requests.

7. The system of claim 6, wherein:
each of the one or more message consumers are garbage collected after processing a specific request of the one or more requests.

8. The system of claim 1 wherein:
the one or more request/response queues comprise a request queue and a response queue;
each asynchronous endpoint is configured to, as a first thread, receive a request from a client, add the request to the request queue, and send an acknowledgement to a requesting client; and
the one or more request/response processors are configured to process the one or more requests from one or more clients directed to the one or more asynchronous web services, and provide appropriate responses to the using the response queues, each of which is configured to receive a request from a request queue directed to that request/response processor, process the request by a second thread associated with that request/response processor, and store a result of the processing in the response queue.

9. A method for providing asynchrony in web services, the method comprising:
providing an application server comprising one or more asynchronous web services which can be accessed by clients using one or more requests as messages received by the application server from the clients, wherein each client indicates a response endpoint at which that client is configured to receive responses made by that client to the asynchronous web services;

providing one or more request/response queues for queuing the requests and the responses;

providing one or more asynchronous endpoints associated with the asynchronous web services, each of which is configured to receive a request from a client, add the request to the request/response queue, and send an acknowledgement to a requesting client; and processing the one or more requests directed to the one or more asynchronous web services by one or more request/response processors associated with the one or more asynchronous endpoints, and provide appropriate responses using the one or more request/response queues, each of which is configured to receive a request from a request/response queue directed to that request/response processor, and process the request by a processing associated with that request/response processor.

10. The method of claim 9, wherein the one or more request/response processors comprise a plurality of Message Driven Beans (MDB), and wherein the plurality of request/response queues comprise a plurality of Java Message Service (JMS) queues.

11. The method of claim 9, further comprising providing a plurality of named message processor pools, and a plurality of web services, wherein a selection of the web services share a common message processor pool.

12. The method of claim 9, further comprising providing a distributed in-memory data grid for use in processing the requests, wherein the distributed in-memory data grid comprises a buffering service which provides access to a plurality of asynchronous queues for queuing the requests, and one or more message consumers for processing the requests.

13. The method of claim 12, further comprising selectively accessing, by the application server, the buffering service using request channels and response channels provided by the distributed in-memory data grid.

14. A non-transitory computer readable storage medium, including instructions stored thereon, which when read and executed by one or more computers, cause the one or more computers to perform steps comprising:

providing an application server comprising one or more asynchronous web services which can be accessed by clients using one or more requests as messages received by the application server from the clients, wherein each client indicates a response endpoint at which that client is configured to receive responses made by that client to the asynchronous web services;

providing one or more request/response queues for queuing the requests and the responses;

providing one or more asynchronous endpoints associated with the asynchronous web services, each of which is configured to receive a request from a client, add the request to the request/response queue, and send an acknowledgement to a requesting client; and processing the one or more requests directed to the one or more asynchronous web services by one or more request/response processors associated with the one or more asynchronous endpoints, and provide appropriate responses using the one or more request/response queues, each of which is configured to receive a request from a request/response queue directed to that request/response processor, and process the request by a processing associated with that request/response processor.

15. The non-transitory computer readable storage medium of claim 14, wherein the one or more request/response processors comprises a plurality of Message Driven Beans (MDB), and wherein the plurality of request/response queues comprises a plurality of Java Message Service (JMS) queues.

16. The non-transitory computer readable storage medium of claim 14, further comprising providing a plurality of named message processor pools, and a plurality of web services, wherein a selection of the web services share a common message processor pool.

17. The non-transitory computer readable storage medium of claim 14, further comprising providing a distributed in-memory data grid for use in processing the requests, wherein the distributed in-memory data grid comprises a buffering service which provides access to a plurality of asynchronous queues for queuing the requests, and one or more message consumers for processing the one or more requests.

18. The non-transitory computer readable storage medium of claim 17, wherein the application server selectively accesses the buffering service using request channels and response channels provided by the distributed in-memory data grid.

* * * * *